United States Patent [19]

Kuhfus et al.

[11] Patent Number: 4,636,591
[45] Date of Patent: Jan. 13, 1987

[54] INTEGRAL TRANSMITTER AND MODULAR JACK ASSEMBLY FOR A TELEPHONE SET

[75] Inventors: Gerd Kuhfus; Charles R. S. Walker, both of London; Anthony H. J. Robinson, Richmond Hill, all of Canada

[73] Assignee: Northern Telecom Limited, Montreal, Canada

[21] Appl. No.: 693,293

[22] Filed: Jan. 22, 1985

[51] Int. Cl.$^4$ .................. H04M 1/03; H04M 1/04
[52] U.S. Cl. .................... 381/159; 379/433; 381/169
[58] Field of Search .............. 179/100 R, 102, 103, 179/178, 179, 101, 121 R, 121 D

[56] References Cited

U.S. PATENT DOCUMENTS

| | | | |
|---|---|---|---|
| 1,915,381 | 6/1933 | Pocock et al. | 179/121 R |
| 4,124,785 | 11/1978 | Seretry et al. | 179/103 |
| 4,291,202 | 9/1981 | Adams et al. | 179/103 |
| 4,319,095 | 3/1982 | Cogan | 179/103 |
| 4,423,293 | 12/1983 | Murayama et al. | 179/179 |

Primary Examiner—Gene Z. Rubinson
Assistant Examiner—Danita R. Byrd
Attorney, Agent, or Firm—Sidney T. Jelly

[57] ABSTRACT

An integral transmitter and modular jack assembly for a telephone set has a hollow housing for the transmitter and the modular jack molded as one member connected by a web. In one form the axes of the housing transmitter and acoustic chamber at the front end of the transmitter are coaxial and normal to the surface of the handset. In another form, the axes of the housing and transmitter are coaxial, but are normal to the surface of the handset, with the axis of the acoustic chamber normal to the axis of the transmitter. Preferably a circuit pattern of lead frame form, has the spring contact members of the jack formed integral with the connecting leads to the transmitter and the connecting leads to the handset receiver.

10 Claims, 9 Drawing Figures

INTEGRAL TRANSMITTER AND MODULAR JACK ASSEMBLY FOR A TELEPHONE SET

This invention relates to the transmitter assembly telephone set, and in particular relates to an integral transmitter and modular jack assembly whereby the number of individual parts is reduced and a cost reduction obtained.

BACKGROUND OF THE INVENTION

It is now a common occurrence that the various conductor cords are connected at their ends by modular plugs which cooperate with modular jacks. Thus, for a handset of a telephone set or other telecommunications terminal, the handset cord has a modular plug at each end, one end being inserted into the modular jack in the telephone set base and the other end being inserted into a modular jack in the handset. The modular jack in the handset is normally at one end, and for convenience and ease of use is at the transmitter end of the handset.

It is also a common occurrence that an electret transducer be used as the transmitter. At present, the modular jack and the housing for the transmitter are separate items, mounted on a small circuit board, with a circuit pattern on the circuit board.

SUMMARY OF THE INVENTION

The present invention provides an integral housing for the transmitter and a modular jack, molded as one member. The electrical connections are obtained by a circuit pattern which is conveniently manufactured in the form of a lead frame. With such a form, the spring cantilever contact members of the modular jack can be formed integral with the circuit pattern. The circuit pattern is then bonded to the molding and the contact members formed to extend into the jack.

Broadly an integral transmitter and modular jack assembly comprises a hollow housing for an electret transmitter the housing having a circular bore extending therethrough, a web extending from the housing in a direction normal to the axis of the bore, a modular jack extending from said web, the jack extending down from the web and having a plug receiving aperture extending in a direction normal to the axis of the bore; and a circuit pattern on a surface of the web remote from the housing and jack, the circuit pattern including spring cantilever contact members extending into the jack.

BRIEF DESCRIPTION OF THE DRAWINGS

The invention will be readily understood by the following description of a particular embodiment, by way of example, in conjunction with the accompanying drawings, in which.

DESCRIPTION OF THE PREFERRED EMBODIMENTS

Figure 1:
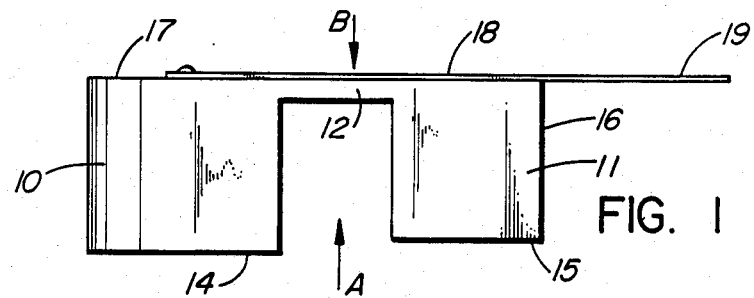
FIG. 1 is a side view of an integral transmitter housing and jack, for one form of installation.
Figure 2:
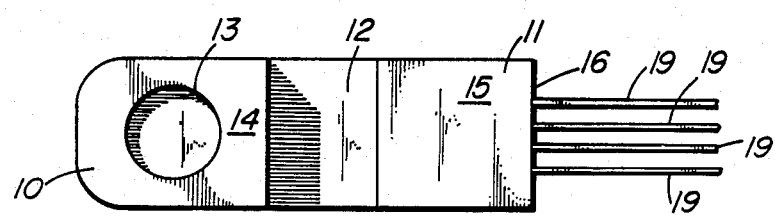
FIGS. 2 and 3 are front and back views respectively, in the directions of arrows A and B in FIG. 1.

As illustrated in FIGS. 1 and 2, a transmitter housing 10 and a modular jack 11 are connected by a web 12 extending between housing and jack at a back surface of each. The unit is molded as one piece. The housing 10 has a bore 13 extending therethrough, the axis of the bore being normal to the plane of web 12. The housing 10 and jack 11 extending side-by-side and in one installation arrangement are mounted with front surfaces 14 and 15 towards the front surface of a handset with the end surface 16 of the jack positioned against or closely adjacent to an end wall of the handset. The front surface 14 is adapted to be sealed against a surface of the handset.

Figure 3:
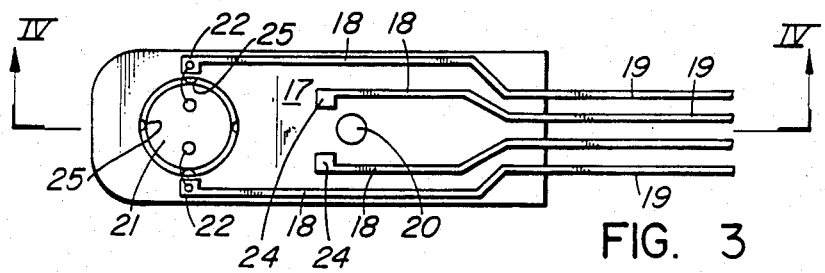

As seen in FIG. 3, on the back surface 17 of housing, jack and web there is provided a circuit pattern 18. From the end surface 16 of the jack extend contact members 19 for the jack. Conveniently, the circuit pattern 18 and contact members 19 are integral, the contact members 19 being formed down into the jack, as will be described later in conjunction with FIG. 4. A hole 20 through the web 12 provides for the use of a screw to hold the unit in position. A transducer 21, an electret transmitter, is shown in the bore 13, in FIG. 3. The transmitter is connected at its back surface to two contact pads 22 on the circuit pattern. Other contact pads 24 are provided for connection of leads to the handset receiver. The circuit pattern may contain further conductors, and contact pads, for connection of other components, such as resistors and/or capacitors, if desired.

Figure 4:
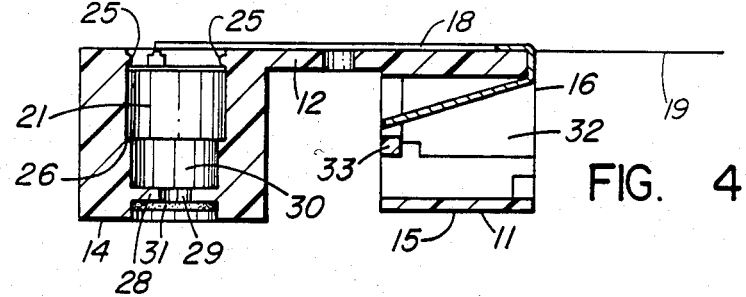
FIG. 4 is a cross-section on the line IV—IV of FIG. 3, but with contact members formed to be positioned in the jack.

FIG. 4 illustrates the unit as ready for mounting in a handset. The transmitter 21 is a fairly close fit in bore 13. Small local projections 25 are deformed when the transmitter is pushed in and snap behind the transmitter to hold it in place. The front end of the transmitter rests on a narrow ledge 26, in the example formed by a slight reduction in diameter of bore 13. Near the front surface 14 of the housing an annular rib or flange 28 is formed in the bore 13, defining an aperture 29 and forming an acoustic chamber, or coupling, 30. A disc of acoustic resistance material 31 is positioned over the front of the aperture 29.

The modular jack portion, in FIG. 4, has the normal rectangular bore 32 extending in from the end surface 16 with a contained aperture at the end surface. The axis of the bore 32 extends normal to the axis of bore 13. At the end remote from the end surface 16 is formed a comb 33, comprising a rib having a plurality of slots therein, a slot for each contact member 19. This particular feature is conventional. In FIG. 4, the contact members having been bent down away from the back surface 17, extending down in shallow grooves formed in the end surface 16. The contact members 19 then are bent inwards, with the free ends positioned in the slots of the comb 33.

The form of the invention, as illustrated in FIGS. 1 to 4 is suitable for mounting in a handset, of the more conventional form, having an enlargement or projecting housing at each end, a receiver being positioned in one housing and the transmitter in the other housing. The jack and transmitter unit illustrated in FIGS. 1 to 4 is shown to an enlarged scale, and the unit would normally fit quite easily in a transmitter housing of a conventional handset.

Figure 5:
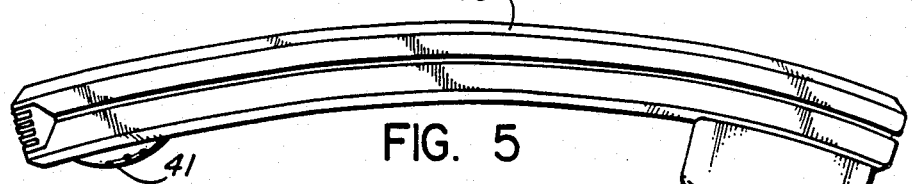
FIGS. 5 and 6 are side and end views respectively of a handset having a very thin or shallow profile at the transmitter end.
Figure 6:
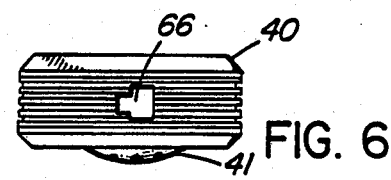

FIGS. 5 and 6 illustrate a handset 40 in which no projecting housing is provided for the transmitter, the handset being very thin and or low profile at the transmitter end. Only a slight dome portion 41 is formed at the transmitter position, the dome having small apertures for passage of speech and the like to the transmitter.

It is possible to make the unit comprising the jack and transducer with a dimension across the unit, normal to the transducer axis, which is smaller than the usual dimension in the direction of the axis. Thus by mounting a unit on its side, a somewhat lower profile can be obtained. Such a mounting requires a different form of acoustic coupling of the transducer.

Figure 7:
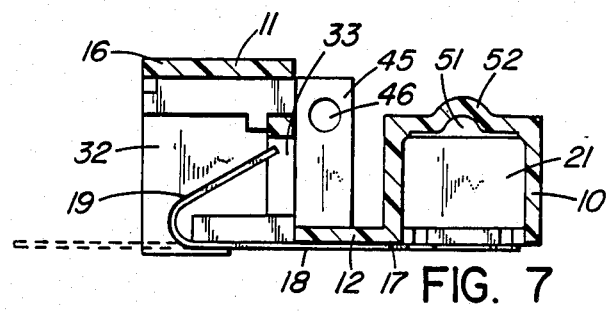
FIG. 7 is a longitudinal cross-section, on the line VII—VII of FIG. 8, and similar to FIG. 4, of an alternative form of the invention for sideways mounting.
Figure 8:
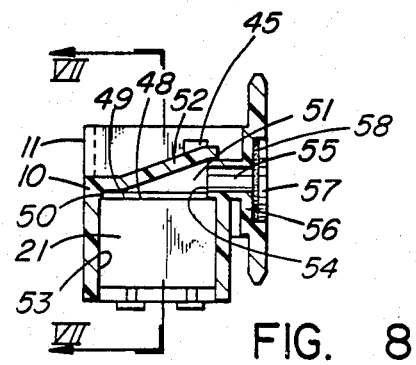
FIG. 8 is a cross-section on the line VIII—VIII of FIG. 9.
Figure 9:
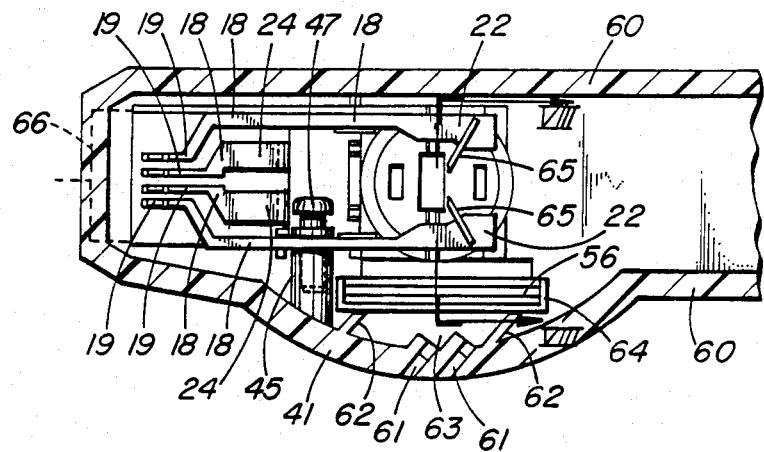
FIG. 9 is a view in the direction of arrow A in FIG. 1, with part of a handset housing shown.

FIGS. 7, 8 and 9 illustrate one form of a unit of modular jack and transmitter for mounting on its side, with FIG. 9 also showing the handset casing. For items which are common with the unit illustrated in FIGS. 1 to 4 the same reference numerals are used. A housing 10 is provided for the electret transmitter 21 and also there is a modular jack 11, the two joined by a web 12. The jack 11 has a profiled aperture 32 extending in from a front surface 16, and also has spring contacts 19 extending round and back, with their free ends positioned in the comb 33. A circuit pattern 18 extends over a back surface of the jack 11, web 12 and housing 10, the contacts 19 being integral with the circuit pattern 18. From the web 12, and attached to the jack 11, extends a flange 45. A hole 46 through the flange 45 provides for the passage of a fastening screw, indicated at 47 in FIG. 9.

With the unit mounted on its side it is necessary to provide a different form of acoustic coupling. In the example of FIGS. 1 to 4, the speech and other vibrations, pass through apertures in the end of the housing having the transmitter mounted therein and pass in a generally axial direction to the transmitter. With the unit mounted on its side, the vibrations will pass to the transmitter in a direction generally normal to the axis of the transmitter.

The coupling of the transmitter is illustrated in FIG. 8. The active, or front, end of the transmitter is at 48. There is a shallow recess 49 formed by a circumferential tip 50 against which the transmitter seats. A tapered semicircular passage 51 is formed in the end 52 of the housing 10, the passage tapering axially with its larger dimension proximate to the bore 53 of the housing 10 in which the transmitter 21 fits. At its radially outer end 54 the passage 51 connects to a circular bore 55 extending through a circular flange 56 attached to the housing 10. Passage 51 and bore 55 form an acoustic chamber, or coupling, for the transmitter. At its outer end the hole 55 is enlarged to a large diameter shallow recess 57. A layer of acoustic resistance material 58 is positioned in the recess 57.

FIG. 9 illustrates the jack and transmitter unit positioned in a handset, any other features of the handset being omitted for clarity. The handset housing is indicated at 60, the dome portion 41 also being shown. Two of the apertures through the dome are indicated at 61. An annular rib 62 also extends from the interior surface of the dome portion 41, the rib extending to enclose a volume 63 which is closed at its inner end by the circular flange 56. The flange has a flexible seal member 64 positioned thereon, the seal member being in firm, sealing engagement with the inner end of the annular rib 62. The volume 63, plus recess 57 and hole 55, act to tune the transmitter 21, to give the desired response curve. Connections between the circuit pattern 18 and the transmitter are shown at 65. The profiled apertures 32 are aligned with a profiled aperture in the end wall of the handset, the aperture in the handset wall indicated at 66 in FIGS. 6 and 9. This aperture need not be profiled, being only rectangular.

While the conductor pattern 18 can be produced by various methods, as are conventionally used for printed circuit boards, for example thick film silk screening, photolithography and other methods, with the contact members attached as by soldering, a convenient way is to form the circuit pattern and contact members in a lead frame structure, as illustration in FIGS. 1 to 4 and FIGS. 7 to 9. The circuit pattern is then mounted on the housing-jack unit, as by bonding. The lead frame structure can be formed by stamping or etching a strip of conductive material. Such members would normally be attached to the contact pads 22 and 24 and extending out to the frame of the lead frame and the contact members 19, if formed integral with the circuit pattern, would also extend to the frame. After bonding of the circuit pattern 18, the contact members 19 would be sheared from the frame and formed, and the support members broken off, for example by forming a localized thin section at the junction between support member and contact pad.

What is claimed is:

1. An integral transmitter and modular jack assembly, for a telephone set, comprising:
    a housing having a cylindrical bore having a central axis;
    a transmitter positioned in said bore, said transmitter having a front end and a back end surface;
    a modular jack extending laterally from said housing, the jack having a rectangular bore having an axis entending normal to said central axis of said cylindrical bore;
    said modular jack having a back surface extending in a plane parallel to said back end surface of said transmitter;
    a web extending between said housing and said modular jack, said web being co-planar with said back surface of said jack and a back surface of said housing;
    spring contact members extending down into said rectangular bore from said back surface of said modular jack;
    contact members on said back end surface of said transmitter; and
    a circuit pattern on said web and connected to said spring contact members and to said contact members on said transmitter.

2. An assembly as claimed in claim 1, said circuit pattern and said spring contact members being an integral lead frame structure.

3. An assembly as claimed in claim 1, including an acoustic chamber extending from said front end of said transmitter.

4. An assembly as claimed in claim 1, said acoustic chamber being coaxial with the axis of said cylindrical bore.

5. An assembly as claimed in claim 1, said acoustic chamber having an axis extending normal to the axis of said cylindrical bore.

6. An assembly as claimed in claim 5, said axis of said cylindrical bore and said axis of said rectangular bore being in a common plane, said axis of said acoustic chamber extending normal to said common plane.

7. An assembly as claimed in claim 5, said acoustic chamber comprising a semi-circular tapered first portion connected at a small end to the front end of said transmitter and connected at a large end to a circular second portion.

8. An assembly as claimed in claim 6, including a web extending in a plane parallel to said common plane, between said modular jack and said housing.

9. An assembly as claimed in claim 7, including an annular flange at an outer end of said acoustic chamber.

10. An assembly as claimed in claim 7, said circular second portion being of a cross-sectional area smaller than the large end of said tapered portion.

* * * * *